Figure 1:
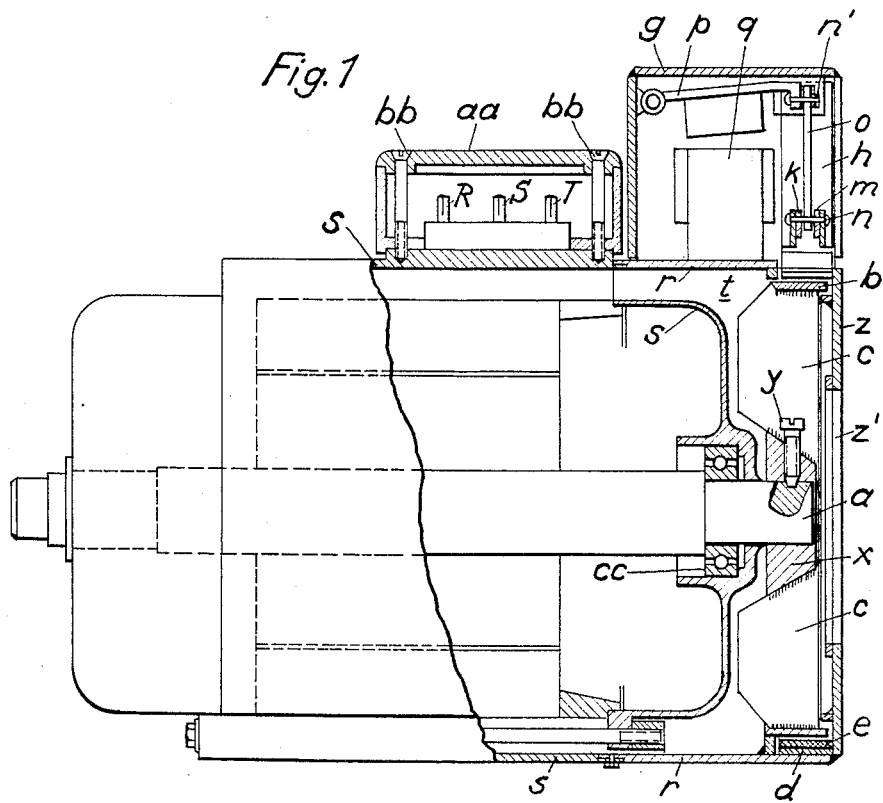

United States Patent Office 2,823,325
Patented Feb. 11, 1958

2,823,325

COMBINATION MOTOR AND MAGNETIC BAND TYPE BRAKE

Alfred Stephan, Hameln (Weser), Germany, assignor to A. Stephan u. Söhne, Hameln, Germany Application November 7, 1955, Serial No. 545,486

11 Claims. (Cl. 310—77)

This invention relates to a magnetic brake of the type having a brake band surrounding a brake drum.

It is an object of the invention to provide a brake which is particularly adapted to be mounted on an electric motor.

Another object of the invention is to provide a magnetic brake permitting the attainment of a particularly high braking effect with extremely low actuating forces and more particularly with a very low electric input, in such a way that the braking moment is a multiple of the torque of the motor.

Still another object of the invention is to accommodate the brake in a special casing which can be easily fitted, for instance, to an existing motor, in the form of an attaching element.

A still further object of the invention is to provide an electric brake which can be easily adjusted, as to its braking power, in accordance with the actual conditions, and more particularly in such a way that different braking effects can be adjusted in opposite direction of rotation.

A further object of the invention is to construct the new device in such a way that it simultaneously acts as a ventilator which is adapted for effectively cooling the brake and, if desired, also the motor to which it is attached.

With these and further objects in view, according to the present invention the braking band is constructed in the form of an open elastic ring, which can be released from its engaged position by a magnet and is mounted at its two ends in such a way that each of the ends has freedom of movement in a direction towards the other end, while in an opposite direction it strikes against a stop, whereby automatically when braking in either direction of rotation, a wrapping effect of the braking band is produced, while, when it is released, a concentric annular gap is produced between the braking band and the brake drum.

A feature of the invention is that the ends of the braking band are arranged in such a way that they bear freely against their stops which preferably are under action of adjustable springs.

Moreover, according to a preferred form of the invention, the magnet acts upon the brake drum through a transmission gear constructed for instance in the form of a toggle lever, said brake drum in its released position preferably being locked by the stretched toggle lever.

In a preferred embodiment of my novel magnetic brake the brake drum is constructed as a ventilator whose cap is attached to a motor casing, preferably so as to be easily detachable; an annular air gap may be formed between the cap and the motor casing, if desired.

Another feature of the invention is that the spring members acting upon the ends of the braking bands and the magnet and preferably also the transmission gear are arranged in a box which is put on the motor casing or on the cap of the ventilator, so as to be detachable, if desired.

Furthermore, it is advantageous to provide the magnet both with a series winding traversed by the motor current, for attaining a high initial power when switching in, and with a shunt winding adapted for producing a sufficient retaining or holding power when the motor is connected.

Other objects, features and advantages of the invention will be pointed out hereinafter and appear in the appended claims forming part of the application.

In the accompanying drawings a now preferred embodiment of the invention is shown by way of illustration and not by way of limitation.

Figure 2:
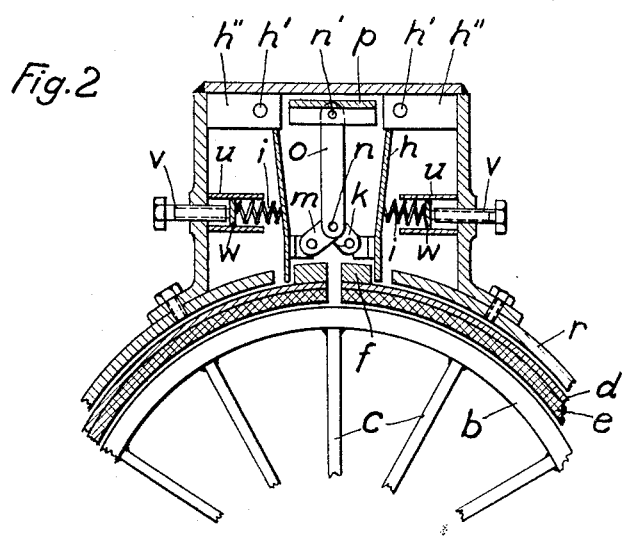
Figure 3:
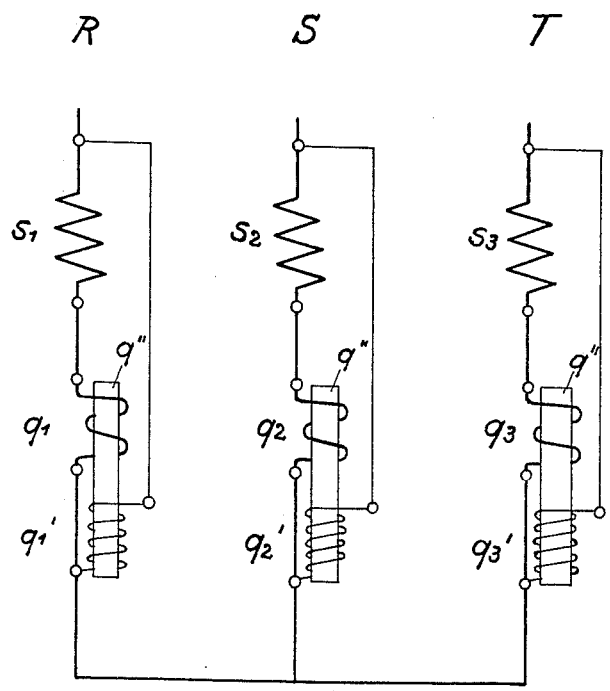

Fig. 1 is a side view, partly in section, of a motor and braking magnet assembly having the invention applied thereto, Fig. 2 is a fragmentary cross sectional view thereof, and Fig. 3 is a connection diagram.

Similar reference numerals denote similar parts in the different views.

Referring now to the drawings in greater detail and first to Fig. 1, it will be seen that a brake drum $b$ with staves $c$ in the form of ventilator blades is mounted on a driving shaft $a$ which is to be braked, by means of a hub $x$ and a set screw $y$. Placed around this brake drum $b$ is a braking band $d$ in the form of an open or split ring which is under spring action in an outward direction and whose inner side bears a brake lining $e$. Put on each of the free ends of this ring is a short strip $f$ serving as a stop and freely engaging two levers $h$ (Fig. 2) suspended in a box $g$ by pivots $h'$ and brackets $h''$ and forming at its lower end an abutment for its stop strip $f$. An adjustable compression spring $i$ guided in a sleeve $u$ secured to the box $g$ bears against each of the levers $h$, the spring pressure being adjustable by a screw $v$ threadably engaged in a bore of the casing $g$ and having at its end a disc $w$ engaging the spring $i$. The lower end of each of the levers $h$ is linked to a leg $k$ or $m$ of a toggle lever system. The levers $k, m$ are jointedly connected, through a link $o$ and joint pins $n$ and $n'$, with the armature $p$ of an electromagnet $q$ (Fig. 1). It will be seen from the drawing that the box $g$ is mounted on the ventilator cap or casing $r$ and the latter is detachably mounted on the motor casing $s$ in which the shaft $a$ is mounted by ball bearings $cc$, in such a manner that the cap $r$ forms an annular air gap $t$ around the casing $s$. An end cover $z$ is detachably mounted on the cap $r$ and formed with a large aperture $z'$ for passage of the air. A terminal box $aa$ is mounted on the casing of the motor $s$ by screws $bb$ and houses insulated terminal plugs R, S, T.

The operation is as follows:

Normally the open ring $d$ engages the brake drum $b$, through the brake lining $e$ attached to the ring $d$, under the continuous action of the springs $i$ which are adjusted so as to exert a predetermined pressure on the stop strips secured to the opposite ends of the brake band $d$.

In order to release the brake, the electric magnet $q$ is excited, whereby its armature $p$, through the control link $o$, forces the toggle lever mechanism $m, k$ into its spread position against action of the springs $i$. From this moment a very small electric power is sufficient to keep the parts $o, m, k$ in the released position.

Since the two ends of the ring are now spaced, the spring force of the open ring $d$ is able to exert its full action, with the result that the outer surface of the ring engages on all sides and uniformly the ventilator casing $r$. Thus it is ensured that a gap which is uniform of its entire length is formed between this ring $d$ and the brake drum $b$, said gap permitting a perfectly free run of the brake drum.

In order to brake the brake drum, irrespective of its direction of rotation, the magnetic excitation is interrupted so that the compression springs $i$ become active again and thus are able to close the open ring $d$ under a predetermined pressure, with compression of its end strips $f$. Therefore, the end of the ring which is on the side in the direction of rotation of the brake drum $b$ is fixedly engaged with the respective pivoted lever $h$ while the other end of the ring is permitted to move forward in the direction of rotation of the brake drum, whereby the ring is fixedly engaged around the brake drum and closed by the rotational movement under a wrapping effect. In this manner an absolutely uniform braking effect is produced on the entire circumference of the brake drum, which effect sets in immediately and is very intensive.

Due to the symmetrical construction and more particularly due to the free slidability of the two ends of the ring, the same conditions will be set up when it is intended to brake the disc $b$ in case of a reverse direction of rotation. In this case, the other end of the braking ring engages its pivoted lever $h$ and thus serves as a fixed point for the braking element $e$ which now is drawn or pulled around the disc in a corresponding opposite direction.

It will be appreciated that the toggle lever system in its spread position must not be forced into a completely aligned or dead center position of its members $m$, $k$, so as to permit the springs $i$ to apply the brake when the magnet $q$ is deenergized. By way of alternative, the link $o$ may be spring-urged in an upward direction.

Since the brake drum itself by the arrangement of the ventilator blades $c$ acts as a ventilator within its cover or casing $r$, the heat produced in the brake by friction is immediately dissipated. The cooling effect in the embodiment shown in Fig. 1 moreover extends over the outer surface of the motor casing, through the annular gap $t$, thus producing favourable conditions for an additional cooling.

Fig. 3 shows a diagram of connection of a three-phase current motor with magnetic brake. It will be seen that the motor is connected to the three phases R, S, T in a star connection, the series windings $q_1$, $q_2$, $q_3$ of the magnet being inserted in series with the respective motor winding $S_1$, $S_2$, $S_3$, while the shunt windings $q_1'$, $q_2'$, $q_3'$ are connected in parallel thereto. The core $q''$ is common to all of the windings $q_1$, $q_2$, $q_3$ and $q_1'$, $q_2'$, $q_3'$, as shown. It will be understood that it is also possible, if desired, to omit the series windings $q_1$, $q_2$, $q_3$ or the shunt windings $q_1'$, $q_2'$, $q_3'$ in order to obtain a shunt-wound or series-wound magnet instead of the compound winding as shown.

It will be appreciated from the above description of my novel construction that the same is able to achieve the objects set forth in the introductory part of the specification. Additionally it permits a different adjustment of the spring forces acting upon the two ends of the braking strip, whereby my novel magnetic brake is particularly adapted for machines, apparatuses or devices, such as elevators, in which the braking force need not be equal, or even has to be greatly different, in the two directions of rotation.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. In a brake mechanism, a brake drum, a split ring comprising a brake band substantially surrounding the brake drum and including a pair of stop faces fixed at opposite ends of the ring, the brake band having the characteristic of being resilient and the ends being free to move toward one another and in either direction of rotation of the drum, a pair of movably mounted spaced abutments each positioned to selectively engage a cooperating stop face on the brake band, the abutments being spaced a selected initial distance, means for selectively moving the abutments closer together and for reducing the diameter of the brake band when the drum is to be braked and means for moving them apart for permitting the brake band to form a substantially concentric gap between it and the brake drum and releasing the drum, whereby when the abutments are moved closer together said abutments engage the stop faces and move the ends of the brake closer together so that the brake band engages the brake band and the stop face leading in the direction of rotation is kept from rotating by its cooperating abutment and the opposite end is permitted to move in the direction of rotation so that the brake band automatically wraps around the drum and brakes it regardless of the direction of rotation.

2. In a brake mechanism, a brake drum, a brake band comprising a split ring substantially surrounding the brake drum and having a pair of stop faces fixed at opposite ends of the ring, the brake band having the characteristics of being elastic and normally maintaining said ends in spaced relationship, a pair of pivotally mounted spaced abutments each positioned to selectively engage a cooperating stop face on the brake band, the brake band being freely mounted capable of rotating in either direction of rotation of the brake drum, means constantly biasing the abutments in a direction toward each other and into engagement with said stop faces for braking the drum, electromagnetic means for selectively moving the abutments apart when energized and for permitting the abutments to be moved toward each other when deenergized, means for selectively energizing and deenergizing said electromagnetic means, whereby when said electromagnetic means is deenergized said abutments are moved closer together and engage the stop faces so as to reduce the space between the ends of the brake band and it engages the drum, and the stop face leading in the direction of rotation is held immobile by its cooperating abutment while the other end is free to rotate with the drum so that the brake band wraps around the drum so as to brake it.

3. In a brake mechanism, a brake drum, a brake band comprising a split ring substantially surrounding the brake drum circumferentially and having a pair of stop faces fixed at opposite ends of the ring, the brake band having the characteristic of being resilient and normally maintaining said ends in spaced relationship being freely mounted and capable of rotating in either direction of rotation of the brake drum when engaged with the drum, a pair of pivotally mounted spaced abutments each positioned to selectively engage a cooperating stop face on the brake band, resilient means constantly biasing the abutments toward each other, electromagnetic means for selectively moving the abutments apart when energized and for permitting the brake band to maintain a selected space between said ends, means for selectively energizing and deenergizing the electromagnetic means, whereby when said electromagnetic means is deenergized the abutments are moved closer together and engage the stop faces so as to reduce the space between the ends of the brake band and it engages the drum, and the leading end toward the direction of rotation is held by its cooperating abutment while the other end moves in the direction of rotation of the drum so that the brake band wraps around the drum and brakes it.

4. In a brake mechanism, a brake drum, a brake band comprising a split ring substantially surrounding the brake drum and having a pair of stop faces fixed at opposite ends of the ring, the brake band having the characteristic of being deformable and resilient and normally tending to increase its diameter by opening the split, at least one of the ends of the ring being free to rotate in the direction of rotation of the brake drum when engaged with the drum, a pair of pivotally mounted spaced abutments each positioned to selectively engage a cooperaing stop face on the brake band, spring means constantly urging the abutments in a direction toward each other and into engagement with the stop faces for braking the drum, electromagnetic means for selectively moving the abutments apart when energized so as to maintain the drum free to rotate when so energized, a movement transmission system operable by said electromagnetic means and operably connected to said abutments, means for selectively energizing and deenergizing said electromagnetic means whereby when said electromagnetic is deenergized the abutments are moved into engagement with the stop faces so as to reduce the diameter of the brake band and the brake band automatically effects a wrapping effect upon the drum so as brake it.

5. A magnetic brake comprising, a brake drum, a brake band surrounding the brake drum in the form of a split and resilient ring including a pair of stop faces disposed at substantially the opposite ends of the ring, a pair of movable abutments each disposed for cooperating with one of said stop faces for braking the drum, each of the ends of the brake band being free to move in a direction toward one another, resilient means for selectively and automatically moving the abutments and the stop faces in a direction for braking the drum, electromagnetic means including a toggle lever system for selectively moving the abutments out of engagement with the stop faces when energized and permitting the brake band to form a concentric annular gap between the brake band and the drum so as to free the drum so that it can rotate, whereby when said electromagnetic means is deenergized said resilient means moves the abutments toward one another thereby moving the ends of the brake band toward one another and the brake band automatically performs a wrapping effect on the brake band braking the drum regardless of the direction of rotation of said drum.

6. In combination with a motor having a motor casing, a magnetic brake comprising a brake drum in the form of a ventilator, a cap member for said ventilator, said cap member being attached to the motor casing, a brake band surrounding the brake drum being constructed in the form of a split resilient ring and including a pair of stop faces at the opposite ends of the ring, a pair of abutments for cooperating with said stop faces in braking the brake drum, each of the ends of the ring being free to move in a direction towards each other, means for selectively and automatically moving the abutments into engagement with the stop faces for braking the drum, electromagnetic means for selectively moving and holding the abutments out of engagement with the stop faces when energized and permitting the drum to rotate freely, whereby when said electromagnetic means is deenergized said means for moving the abutments into engagement with the stop faces moves the abutments in a direction toward each other and the brake band engages the drum and the stop face leading in the direction of rotation is held stationary by its cooperating abutment while the other end is free to rotate with the drum so that the brake band automatically wraps around the drum so as to brake it.

7. In combination with a motor having a motor casing, a magnetic brake comprising a brake drum constructed as a ventilator, a cap for said ventilator said cap being detachably attached to the motor casing, a brake band surrounding the brake drum being constructed in the form of a split resilient ring and including a pair of stop faces at the opposite ends of the ring, a pair of abutments for cooperating with said stop faces in braking the brake drum, each of the ends of the ring being free to move in a direction towards each other, means for selectively and automatically moving the abutments into engagement with the stop faces for braking the drum, electromagnetic means for selectively moving and holding the abutments out of engagement with the stop faces when energized and permitting the drum to rotate freely, whereby when said electromagnetic means is deenergized said means for moving the abutments into engagement with the stop faces moves the abutments in a direction toward each other and the brake band engages the drum and the stop face leading in the direction of rotation is held stationary by its cooperating abutment while the other end is free to rotate with the drum so that the brake band automatically wraps around the drum so as to brake it.

8. In combination with a motor having a motor casing, a magnetic brake comprising a brake drum constructed as a ventilator, a cap for said ventilator, said cap being constructed and attached to the motor casing so as to form an annular gap between the cap and the motor casing, a brake band comprising a split ring having a pair of stop faces disposed at the opposite ends of the ring, the brake band substantially surrounding the drum and having the characteristic of being elastic, a pair of abutments for cooperating with said stop faces for braking the drum, each of the ends of the brake band being free to move in a direction towards the other, means for selectively and automatically moving the abutments into engagement with the stop ends for moving the brake band ends toward each other so that the brake band engages and brakes the drum, electromagnetic means for selectively moving and holding the abutments out of engagement with the stop faces when energized and permitting the brake band to define a gap between it and the brake drum so that the drum can rotate freely, whereby when the electromagnetic means is deenergized the abutments are moved so as to engage the brake band with the drum and one end is held immobile while the other moves in the direction of rotation of the drum so that the brake band automatically wraps around the drum so as to brake it.

9. In combination with a motor having a casing, a magnetic brake including a ventilator comprising a brake drum, a cap for said ventilator, the cap being detachably secured to the motor casing, a brake band substantially surrounding the brake drum and comprising a split ring having a pair of stop faces fixed at substantially the opposite ends of the split ring, the ring having the characteristic of being resilient and tending to expand radially, a pair of movable abutments disposed for cooperating with said stop faces in braking the drum, a plurality of springs for forcing each of the abutments into engagement with an associated stop face and partially closing the ring, electromagnetic means for selectively moving the abutments against the pressure exerted by said springs and holding them out of engagement with said stop faces, said electromagnetic means being adapted to move the abutments out of engagement with the stop faces when energized and when the abutments are moved out of engagement with the stop faces the split ring is permitted to expand and define a gap between it and the drum so that the drum rotates freely, means to selectively energize and deenergize the electromagnetic means, whereby when deenergized the abutments are automatically moved into engagement with the stop faces partially closing the ring and the stop face leading in the direction of rotation is kept from rotating with the drum by its cooperating abutment and the opposite end is permitted to move in the direction of rotation so that the brake band automatically wraps around the drum and brakes it.

10. In combination with an electric motor, a magnetic brake comprising a brake drum, a brake band substantially surrounding the brake drum, the brake band comprising a split ring having the characteristic of being resilient and normally tending to expand radially and having a pair of stop faces disposed at substantially the opposite ends of the split ring, a pair of abutments movable in and out of engagement with said stop faces for braking and releasing the drum, the ends of the ring being free to move in a direction toward each other, electromagnetic means for selectively permitting the abutments to engage the stop faces for braking the drum when deenergized and for moving the abutments out of engagement with the stop faces when energized so as to release the drum, means for automatically engaging the abutments with said stop when said electromagnetic means is deenergized, said electromagnetic means including a first winding connected in series with the motor and at least one winding in parallel with the motor for energizing the electromagnetic means, whereby when energized said electromagnetic means disengages the abutments and stop faces, the ring is permitted to expand radially and release the brake and when deenergized said means for engaging the abutments and the stop ends automatically engages them.

11. A magnetic brake comprising a brake drum, a brake band substantially surrounding the brake drum, said brake band comprising a split ring having the characteristics of being resilient and normally tending to expand radially and having a pair of stop faces disposed at substantially the opposite ends of the split ring, the ends of the ring being normally free to move in a direction toward one another, a plurality of movable spaced abutments disposed for selectively engaging a cooperating stop face on the brake band and reducing the diameter of the brake band so as to brake the drum, a plurality of pressure-exerting springs constantly biasing the abutments into engagement with the stop faces and in a direction toward braking the drum, means to adjust the pressure at which some of said springs bias the abutments so as to brake harder in one direction of rotation, electromagnetic means connected to overcome the pressure exerted by said springs when energized and maintain the abutments spaced for permitting the brake band to expand radially and maintain the drum in a released condition so that it can rotate freely, whereby when deenergized the electromagnetic means permits the springs to automatically move the abutments into engagement with the stop faces reducing the diameter of the brake band so that it engages the drum, and the stop face leading in the direction of rotation is kept from rotating by its cooperating abutment and the opposite end is permitted to move in the direction of rotation so that the brake band automatically wraps around the drum and brakes it regardless of the direction of rotation.

References Cited in the file of this patent

UNITED STATES PATENTS

| 1,231,590 | Friedlaender | July 3, 1917 |
| 2,121,889 | Sousedik | June 28, 1938 |

FOREIGN PATENTS

| 868,088 | Germany | Feb. 23, 1953 |